United States Patent
Lee et al.

(10) Patent No.: US 9,948,491 B2
(45) Date of Patent: Apr. 17, 2018

(54) APPARATUS AND METHOD FOR ESTIMATING CARRIER FREQUENCY OFFSET

(71) Applicant: MStar Semiconductor, Inc., Hsinchu Hsien (TW)

(72) Inventors: Kuan-Chou Lee, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/408,622

(22) Filed: Jan. 18, 2017

(65) Prior Publication Data

US 2018/0054344 A1 Feb. 22, 2018

(30) Foreign Application Priority Data

Aug. 19, 2016 (TW) .............................. 105126585 A (51) Int. Cl.
*H04L 27/38* (2006.01)
*H04L 27/18* (2006.01)
(52) U.S. Cl.
CPC .......... *H04L 27/3854* (2013.01); *H04L 27/18* (2013.01)
(58) Field of Classification Search
CPC ..................... H04L 27/3854; H04L 27/18
See application file for complete search history.

(56) References Cited

U.S. PATENT DOCUMENTS

| | | | | |
|---|---|---|---|---|
| 7,388,541 | B1* | 6/2008 | Yang | .................... G01C 21/206 |
| | | | | 342/464 |
| 2003/0147456 | A1* | 8/2003 | Kumura | .............. H04L 27/0014 |
| | | | | 375/148 |

(Continued)

FOREIGN PATENT DOCUMENTS

| CN | 1980207 A | 6/2007 |
|---|---|---|
| CN | 103297363 A | 9/2013 |

OTHER PUBLICATIONS

TIPO Office Action, dated Feb. 21, 2018, 5 pages.

*Primary Examiner* — Kenneth Lam
(74) *Attorney, Agent, or Firm* — Edell, Shapiro & Finnan, LLC (57) ABSTRACT

An apparatus for estimating carrier frequency offset includes an $M^{th}$-power circuit, a spectrum generating circuit, a spectrum adjusting circuit, a peak frequency determining circuit and a frequency offset determining circuit. The $M^{th}$-power circuit performs an $M^{th}$-power calculation on an input signal to generate an $M^{th}$-power calculation result. The spectrum generating circuit generates a spectrum according to the $M^{th}$-power calculation result. The spectrum adjusting circuit identifies a partial energy peak value in a partial frequency range from the spectrum, and increases the partial energy peak value to be higher than any other energy in the spectrum to generate an adjusted spectrum. The peak frequency determining circuit identifies a peak frequency having a maximum energy peak value from the adjusted spectrum. The frequency offset determining circuit determines an estimated carrier frequency offset result according to the peak frequency.

6 Claims, 9 Drawing Sheets

(56) References Cited

U.S. PATENT DOCUMENTS

| | | | |
|---|---|---|---|
| 2005/0068886 A1* | 3/2005 | Wang | H04L 27/2607 370/210 |
| 2011/0096684 A1* | 4/2011 | Liao | H04L 12/2801 370/252 |
| 2011/0129045 A1* | 6/2011 | Tseng | H04L 27/0014 375/344 |
| 2013/0215950 A1* | 8/2013 | Liao | H04L 25/0262 375/225 |
| 2013/0258201 A1* | 10/2013 | Chang | H04N 9/67 348/660 |
| 2013/0259173 A1* | 10/2013 | Varanese | H04L 1/0001 375/346 |

* cited by examiner

APPARATUS AND METHOD FOR ESTIMATING CARRIER FREQUENCY OFFSET

This application claims the benefit of Taiwan application Serial No. 105126585, filed Aug. 19, 2016, the subject matter of which is incorporated herein by reference.

BACKGROUND OF THE INVENTION

Field of the Invention

The invention relates in general to an electronic signal receiving apparatus, and more particularly to a technology for estimating carrier frequency offset (CFO) in an electronic signal receiving apparatus.

Description of the Related Art

Various types of communication systems get more and more popular as related technologies in the electronics field continue to advance. Each of a transmitter and a receiver of a communication system are provided with at least one oscillation signal source (e.g., a quartz oscillator) that provides a clock signal as a basis for circuit operations. During an operation process, clock frequencies of the transmitter and the receiver need to achieve a certain consistency in order to have the receiver correctly parse signals sent from the transmitter. An issue that the frequency of a clock signal that the receiver adopts for down-converting an input signal differs from the frequency of a clock signal that the transmitter adopts for up-converting a baseband signal, is commonly referred to as carrier frequency offset (CFO) at the receiver. The CFO may lead to inter-carrier interference, causing negative effects such as degraded system performance of the receiver, and the receiver may even become incapable of parsing its input signal in some severe cases.

Exact matching between the oscillators of a transmitter and a receiver is extremely difficult, and so the receiver is usually designed with a mechanism for compensating the CFO. In general, a receiver needs to first correctly estimate the value of the CFO before frequency offset compensation is conducted.

Figure 1A:
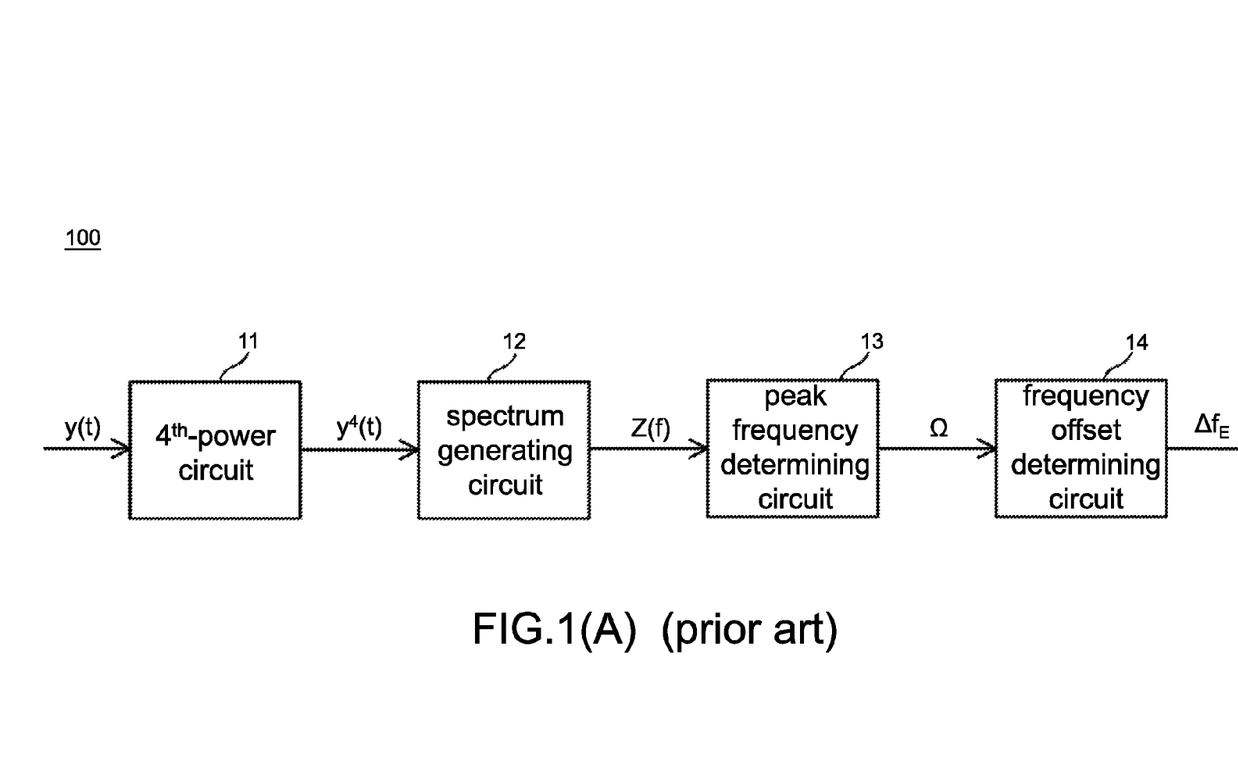
FIG. 1(A) is a block diagram of carrier frequency offset (CFO) estimating apparatus applicable to a quadrature phase shift keying (QPSK) signal.

FIG. 1(A) shows a block diagram of CFO estimating apparatus applicable to a quadrature phase shift keying (QPSK) signal. As shown in FIG. 1(A), a CFO estimating apparatus 100 includes a $4^{th}$-power circuit 11, a spectrum generating circuit 12, a peak frequency determining circuit 13 and a frequency offset determining circuit 14. An input signal y(t) of the $4^{th}$-power circuit 11 may be a QPSK baseband signal, which may be a baseband signal generated by processing a radio-frequency (RF) signal, which is received by a receiver coordinating with the CFO estimating apparatus 100, by circuits such a low-noise amplifying circuit, a down-converting circuit, an analog-to-digital converter (ADC) and a low-pass filter (LPF). The $4^{th}$-power circuit 11 performs a $4^{th}$-power calculation on the input signal y(t) to generate a $4^{th}$-power calculation result $y^4(t)$. The spectrum generating circuit 12 generates a spectrum Z(f) by performing fast Fourier transform (FFT) according to the $4^{th}$-power calculation result $y^4(t)$ outputted from the $4^{th}$-power circuit 11.

Figure 1B:
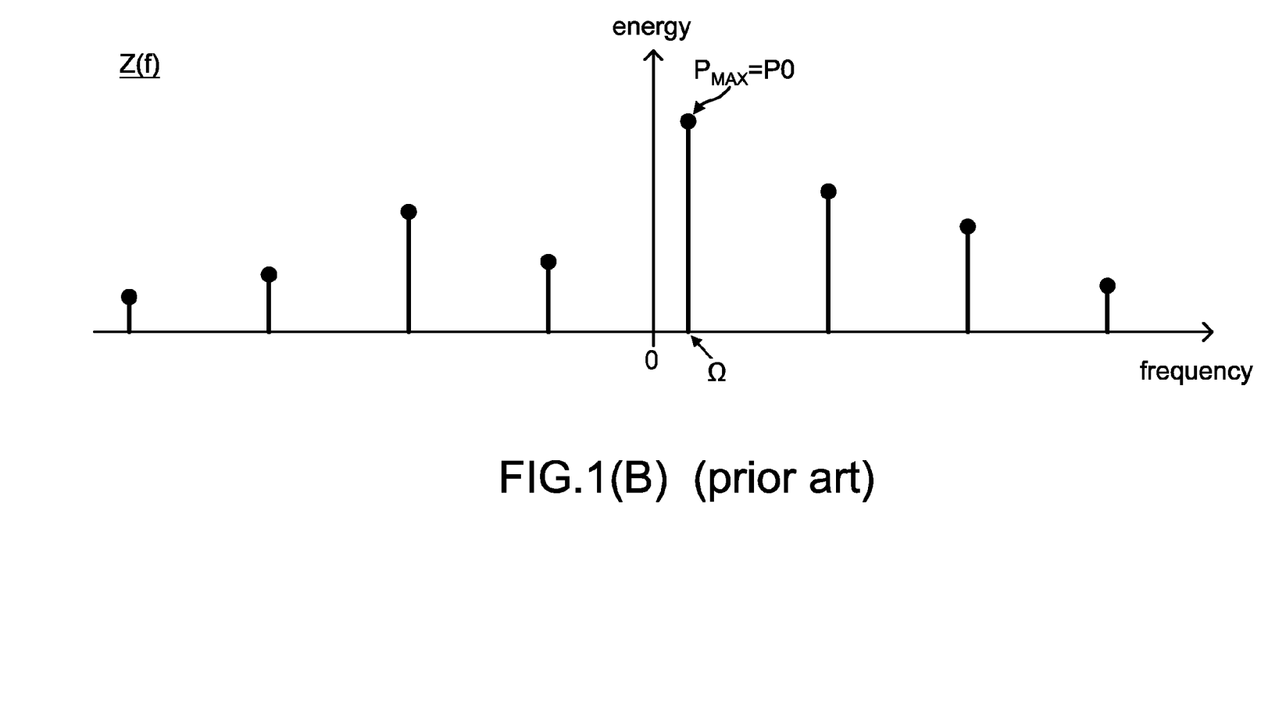

The peak frequency determining circuit 13 identifies a peak value having a highest energy from the spectrum Z(f), and determines a peak frequency $\Omega$ corresponding to the peak value. Based on QPSK signal characteristics, when the input signal y(t) is transmitted to the receiver coordinating with the CFO estimating apparatus 100 through a single path, the frequency corresponding the highest energy in the spectrum Z(f) is approximately equal to four times the carrier frequency offset (4$\Delta f$). Therefore, the frequency offset determining circuit 14 divides the peak frequency $\Omega$ determined by the peak frequency determining circuit 13 by 4 to determine an estimated CFO result $\Delta f_E$ as an output signal of the CFO estimating apparatus 100. Taking the spectrum Z(f) in FIG. 1(B) for example, the peak frequency determining circuit 13 selects energy P0 as the maximum energy peak value $P_{MAX}$, and selects its corresponding frequency as the peak frequency $\Omega$.

Figure 1C:
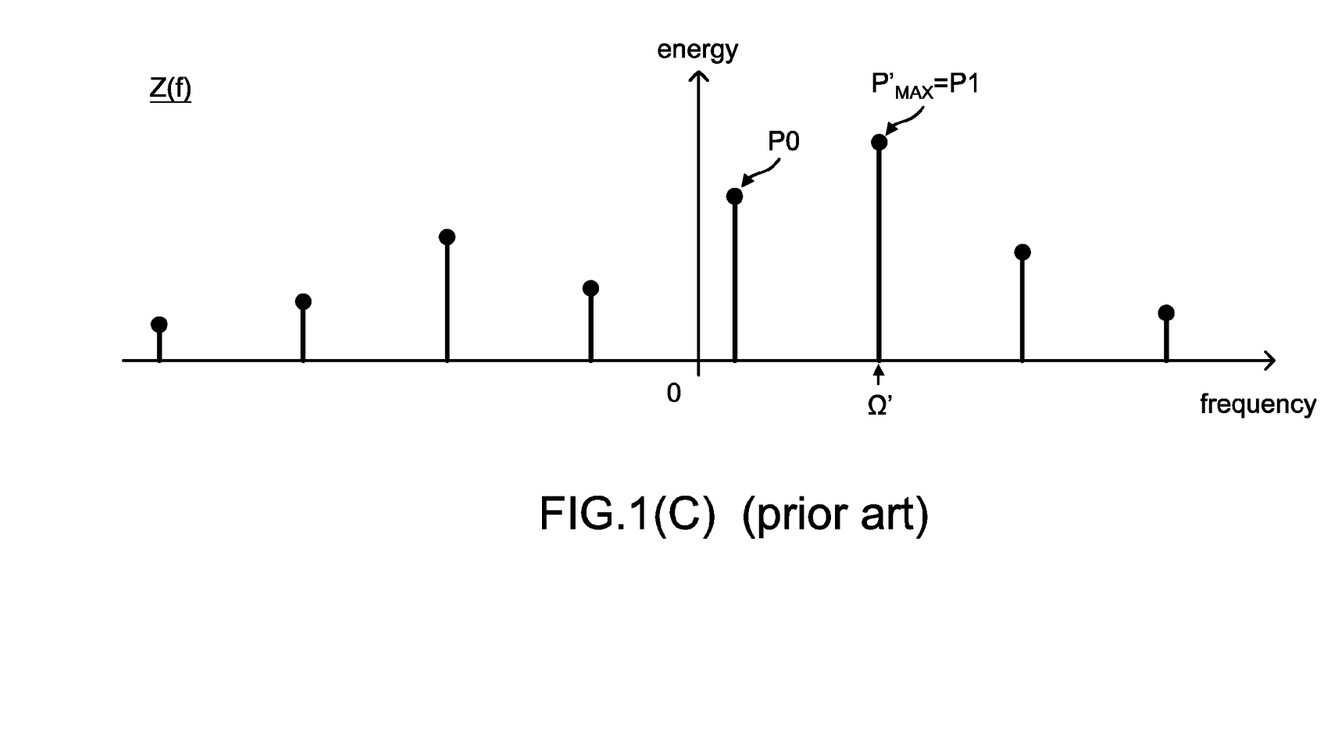

However, if the input signal y(t) is transmitted to the receiver coordinating with the CFO estimating apparatus 100 through a multipath, the input signal y(t) is often mixed with interference signals having similar frequencies as the actual data signal. Such interference signals are referred to as echo signals. Echo signals affect the energy distribution of the foregoing spectrum Z(f) to an extent that the peak frequency $\Omega$ calculated by the peak frequency determining circuit 13 may not be four times the CFO frequency, in a way that the frequency offset determining circuit 14 generates an incorrect estimated CFO result. FIG. 1(C) shows an exemplary spectrum Z'(f) in which energy distribution is changed due to echo signals. In this example, the frequency corresponding to the energy P0 is the four-fold carrier frequency offset $4\Delta f$. However, the peak frequency determining circuit 13 selects the energy P1 as the maximum energy peak value $P'_{MAX}$ and its corresponding frequency as the peak frequency $\Omega'$, such that the frequency offset determining circuit 14 calculates an incorrect estimated CFO result $\Delta f_E'$.

SUMMARY OF THE INVENTION

The invention is directed to an apparatus and a method for estimating carrier frequency offset (CFO).

An apparatus for estimating carrier frequency offset is provided according to an embodiment of the present invention. The apparatus includes an $M^{th}$-power circuit, a spectrum generating circuit, a spectrum adjusting circuit, a peak frequency determining circuit, and a frequency offset determining circuit. The $M^{th}$-power circuit performs an $M^{th}$-power calculation on an input signal to generate an $M^{th}$-power calculation result, where M is an integer greater than 1 and is associated with a modulation scheme of the input signal. The spectrum generating circuit generates a spectrum according to the $M^{th}$-power calculation result. The spectrum adjusting circuit identifies a partial energy peak value in a partial frequency range from the spectrum, and increases the partial energy peak value to generate an adjusted spectrum. The partial frequency range is $-\frac{1}{2}T$ to $\frac{1}{2}T$, where T represents a symbol duration of the input signal. The peak frequency determining circuit identifies a peak frequency having a maximum energy peak value from the adjusted spectrum. The frequency offset determining circuit determines an estimated CFO result according to the peak frequency.

A method for estimating carrier frequency offset (CFO) is further provided according to an embodiment of the present invention. An $M^{th}$-power calculation is performed on an input signal to generate an $M^{th}$-power calculation result, where M is an integer greater than 1 and is associated with a modulation scheme of the input signal. A spectrum is generated according to the $M^{th}$-power calculation result. A partial energy peak value in a partial frequency range is identified from the spectrum, wherein the partial frequency range is $-\frac{1}{2}T$ to $\frac{1}{2}T$ and T represents a symbol duration of the input signal. The partial energy peak value is increased to generate an adjusted spectrum. A peak frequency having a maximum energy peak value is identified from the adjusted spectrum. An estimated CFO result is determined according to the peak frequency.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1(B) and FIG. 1(C) are examples of spectra of signals transmitted through a single path and a multipath, respectively;

FIG. 4 (A) is an example of a spectrum; FIG. 4(B) is an example of an adjusted spectrum generated by a spectrum adjusting circuit according to an embodiment of the present invention;

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

An apparatus and method for estimating carrier frequency offset (CFO) of the present invention may coordinate or be integrated in receivers in various types of communication systems needing to estimate carrier frequency offset, e.g., Digital Video Broadcasting—Satellite (DVB-S) receivers and Digital Video Broadcasting—Cable (DVB-C) receivers.

Figure 2:
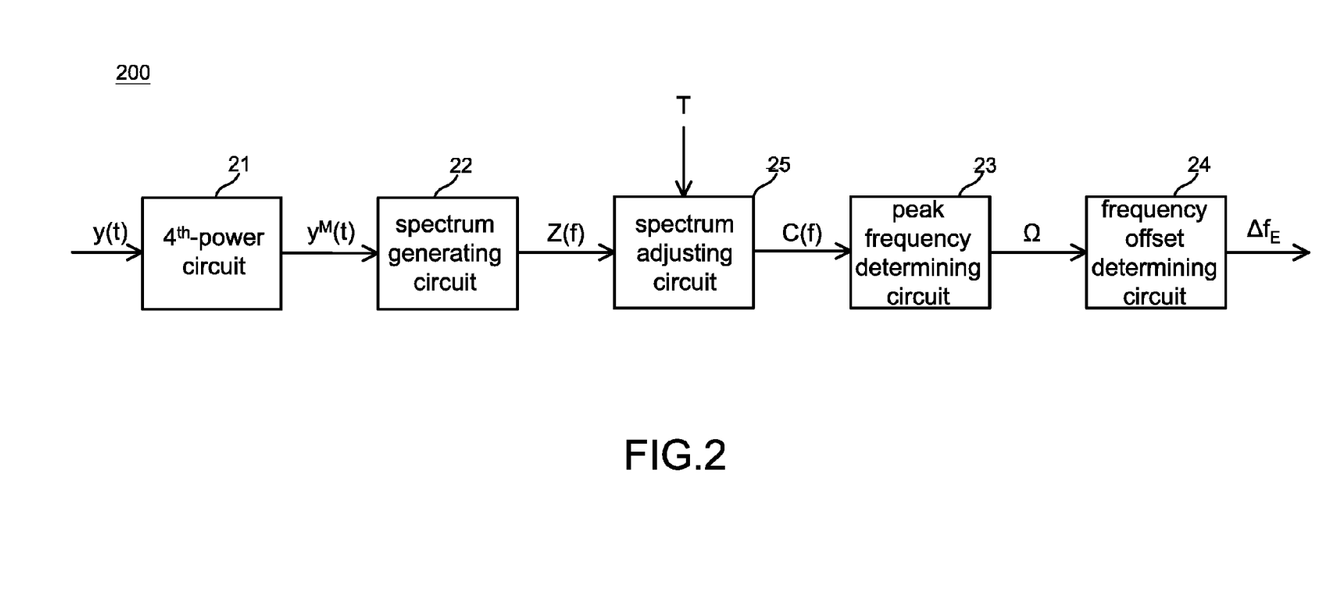
FIG. 2 is a block diagram of an apparatus for estimating carrier frequency offset according to an embodiment of the present invention.

FIG. 2 shows a block diagram of an apparatus for estimating CFO according to an embodiment of the present invention. As shown in FIG. 2, a CFO estimating apparatus 200 includes a $4^{th}$-power circuit 21, a spectrum generating circuit 22, a spectrum adjusting circuit 25, a peak frequency determining circuit 23, and a frequency offset determining circuit 24. An input signal y(t) of the $4^{th}$-power circuit 21 is a quadrature phase shift keying (QPSK) baseband signal. In practice, the baseband signal may be, for example but not limited to, a corresponding baseband signal generated by processing a radio-frequency (RF) signal, which is received by a receiver coordinating with the CFO estimating apparatus 200, by circuits such a low-noise amplifying (LNA) circuit, a down-converting circuit, an analog-to-digital converter (ADC) and a low-pass filter (LPF). The $4^{th}$-power circuit 21 performs a $4^{th}$-power calculation on the input signal y(t) to generate a $4^{th}$-power calculation result $y^4(t)$. Implementation details of the $4^{th}$-power calculation circuit 21 are generally known to one person skilled in the art, and shall be omitted herein.

Next, the spectrum generating circuit 22 generates a spectrum Z(f) according to the $4^{th}$-power calculation result $y^4(t)$. In practice, the spectrum generating circuit 22 may generated the spectrum by, for example but not limited to, fast Fourier transform (FFT). It should be noted that, details for generating the spectrum are generally known to one person skilled in the art, and shall be omitted herein.

Figure 3:
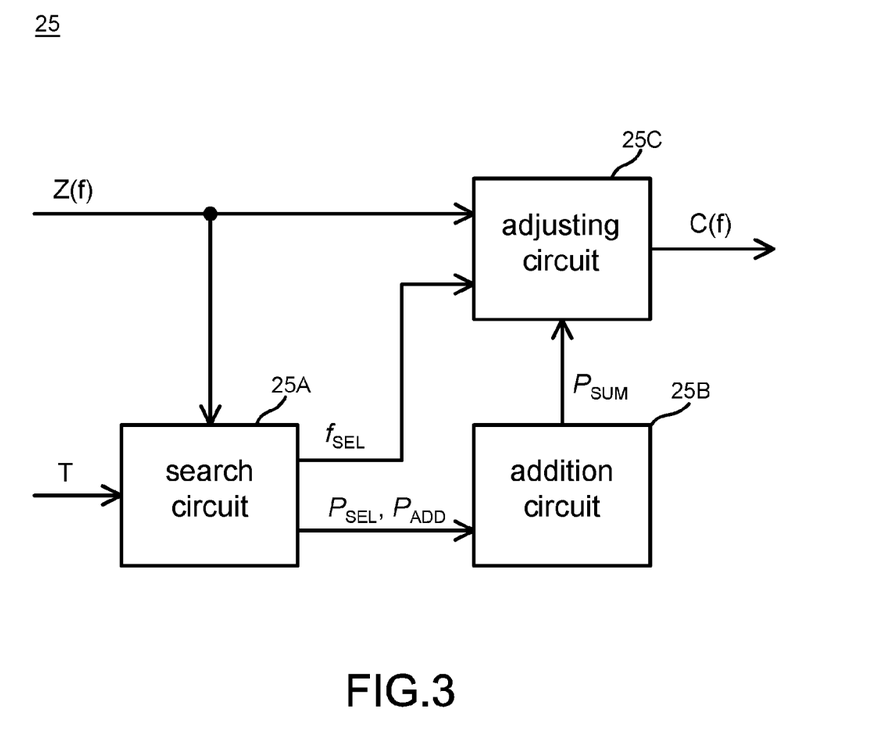
FIG. 3 is a block diagram of a spectrum adjusting circuit according to an embodiment of the present invention.
Figure 5:
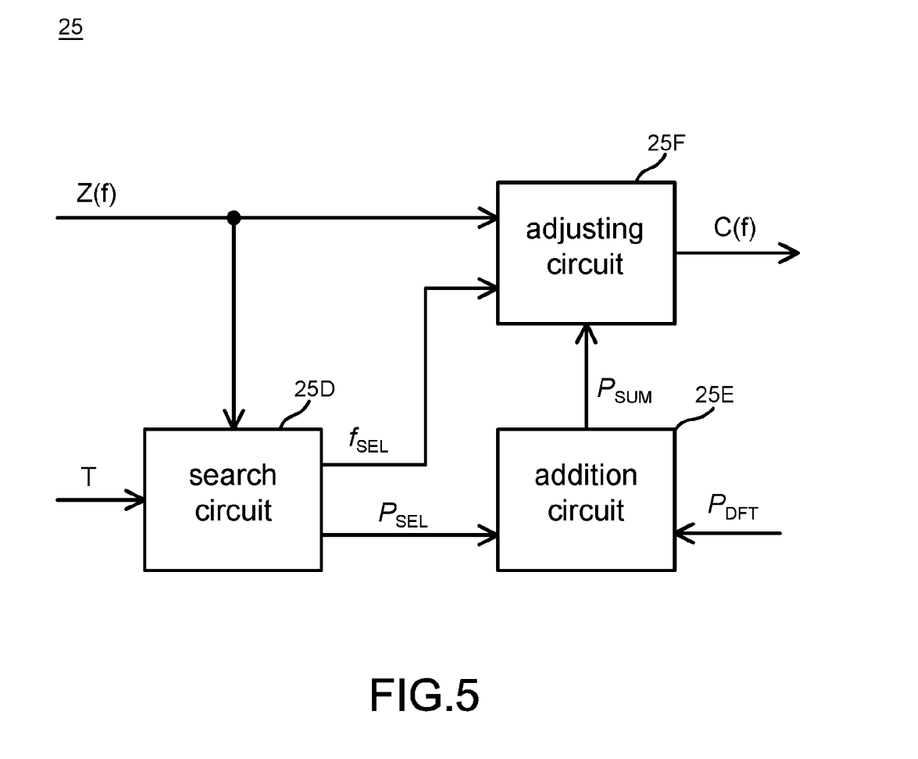
FIG. 5 is a block diagram of a spectrum adjusting circuit according to another embodiment of the present invention.

One task of the spectrum adjusting circuit 25 is identifying a partial energy peak value $P_{SEL}$ from the spectrum Z(f). The partial energy peak value $P_{SEL}$ is, in the partial frequency range $-\frac{1}{2}T$ to $\frac{1}{2}T$, a peak value having the maximum energy value, where T represents a symbol duration of the input signal y(t), and may be learned from parsing an input signal y(t) by other circuit in the receiver coordinating with the CFO estimating apparatus 200 or may be a constant value agreed by both of the transmitter and the receiver. The spectrum adjusting circuit 25 then identifies a partial peak frequency $f_{SEL}$ according to the partial energy peak value $P_{SEL}$, wherein the partial peak frequency $f_{SEL}$ is the frequency the partial energy peak value $P_{SEL}$ corresponds to. Based on the rule of thumb, the carrier frequency offset $\Delta f$ is not a large value, and the four-fold carrier frequency offset $4\Delta f$ usually falls within the above partial frequency range $-\frac{1}{2}T$ to $\frac{1}{2}T$. Thus, the frequency (i.e., the partial peak frequency $f_{SEL}$) corresponding to the partial energy peak value $P_{SEL}$ the spectrum adjusting circuit 25 identifies is usually the four-fold carrier frequency offset $4\Delta f$. Next, the spectrum adjusting circuit 25 increases the energy corresponding to the partial peak frequency $f_{SEL}$ to generate an adjusted spectrum C(f). FIG. 3 and FIG. 5 depict two embodiments for illustrating how the spectrum adjusting circuit 25 adjusts the energy corresponding to the partial peak frequency $f_{SEL}$.

In the embodiment in FIG. 3, the spectrum adjusting circuit 25 includes a search circuit 25A, an addition circuit 25B and an adjusting circuit 25C. The search circuit 25A identifies the partial energy peak value $P_{SEL}$ from the spectrum Z(f), and identifies the corresponding partial peak frequency $f_{SEL}$ according to the partial energy peak value $P_{SEL}$. The search circuit 25A further identifies a plurality of energy increments $P_{ADD}$, which are, in the spectrum Z(f), corresponding energies of a plurality of frequencies associated with the partial peak frequency $f_{SEL}$ and the symbol duration T of the input signal. Based on observations on characteristics of QPSK signals, relative energy peaks also exist at frequencies that are spaced by integral multiples of $1/T$ from the partial peak frequency $f_{SEL}$. That is to say, relative energy peaks exist at positions of frequencies $(f_{SEL}\pm1/T)$, $(f_{SEL}\pm2/T)$, $(f_{SEL}\pm3/T)$ . . . in the spectrum Z(f). Further, the sampling frequency $F_S$ of the input signal y(t) limits the frequency range of the CFO estimating apparatus 200. For example, the frequency range the spectrum Z(f) covers may be limited between $-F_S/2$ and $F_S/2$. Thus, in one embodiment, the search circuit 25A identifies energies corresponding to a plurality of frequencies $(F_{SEL}+n/T)$ spaced by integral multiples of $1/T$ from the partial peak frequency $f_{SEL}$ as the energy increments $P_{ADD}$, where n is an integral index value in a predetermined range such that the plurality of frequencies ($F_{SEL}+n/T$) fall in the frequency range $-F_S/2$ and $F_S/2$.

Figure 4:
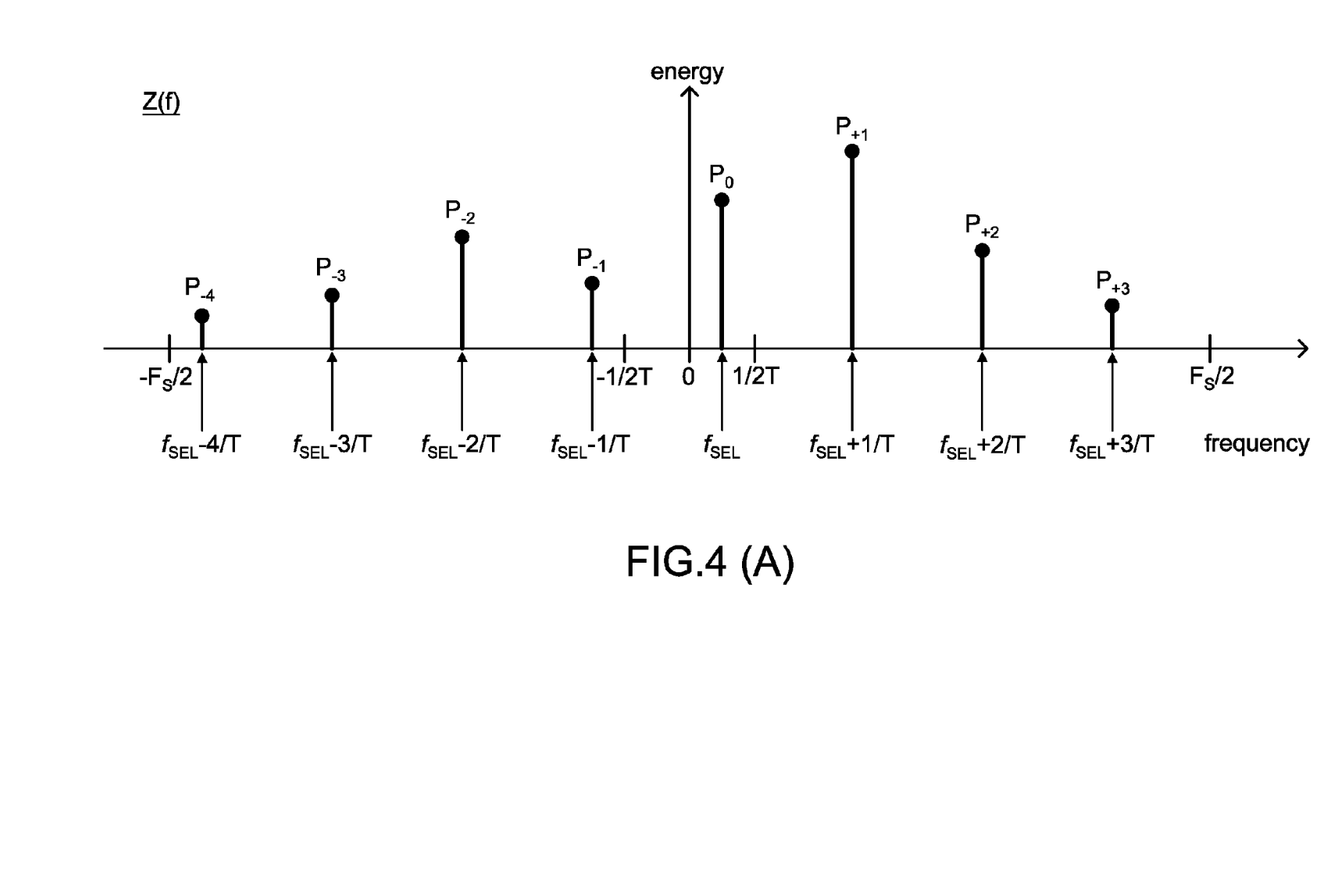

FIG. 4(A) shows an example of a spectrum of a signal transmitted through a multipath. In FIG. 4(A), in the frequency range $-F_S/2$ and $F_S/2$, there are seven frequencies ($F_{SEL}+n/T$) that are spaced by integral multiples of $1/T$ from the partial peak frequency $f_{SEL}$. The search circuit 25A may select the energies ($P_{-4}$ to $P_{-1}$ and $P_{+1}$ to $P_{+3}$) corresponding to these frequencies as the energy increments $P_{ADD}$.

The addition circuit 25B adds up the energy increments $P_{ADD}$ and the partial energy peak value $P_{SEL}$ to generate an adjusted energy $P_{SUM}$. Next, the adjusting circuit 25C adjusts the spectrum $Z(f)$ according to the partial peak frequency $f_{SEL}$ and the adjusted energy $P_{SUM}$ to generate an adjusted spectrum $C(f)$. In the adjusted spectrum $C(f)$, the energy corresponding to the partial peak frequency $f_{SEL}$ is equal to the adjusted energy $P_{SUM}$. In one embodiment, the adjusting circuit 25C changes only the energy corresponding to the partial peak frequency $f_{SEL}$ but not the energies corresponding to the other frequencies in the spectrum $Z(f)$; that is, the energies corresponding to the other frequencies in the adjusted spectrum $C(f)$ and in the spectrum $Z(f)$ are the same. Taking FIG. 4(A) for example, the adjusted spectrum $C(f)$ in FIG. 4(B) is an example of the spectrum $Z(f)$ that is adjusted by the adjusting circuit 25C. As seen from FIG. 4(B), in the adjusted spectrum $C(f)$, an adjusted energy $P_{SUM}$ corresponding to the partial peak frequency $f_{SEL}$ is a sum of eight energies $P_{-4}$ to $P_{+3}$ in the spectrum $Z(f)$, and the other parts in the adjusted spectrum $C(f)$ are identical to those in the spectrum $Z(f)$.

In practice, the energies corresponding to the frequencies in the spectrum $Z(f)$ may be respectively stored in multiple registers by the spectrum generating circuit 22. The adjusting circuit 25C can adjust the spectrum by setting contents of the registers corresponding to the frequencies to be adjusted.

After the spectrum adjusting circuit 25 generates the adjusted spectrum $C(f)$, the peak frequency determining circuit 23 identifies a peak frequency $\Omega$ from the adjusted spectrum $C(f)$. Observing the adjusted spectrum $C(f)$ in FIG. 4B, it is seen that the peak frequency determining circuit 23 selects the adjusted peak energy $P_{SUM}$ as the maximum peak value after the spectrum $Z(f)$ is adjusted by the spectrum adjusting circuit 25, and determines the partial peak frequency $f_{SEL}$ corresponding to the adjusted energy $P_{SUM}$ as the peak frequency $\Omega$. Next, the frequency offset determining circuit 24 determines an estimated CFO result $\Delta f_E$ according to the peak frequency $\Omega$. More specifically, the frequency offset determining circuit 24 may divide the peak frequency $\Omega$ by 4 to generate the estimated CFO result $\Delta f_E$.

As previously stated, the partial peak frequency $f_{SEL}$ that the frequency adjusting circuit 25 identifies is usually the four-fold carrier frequency offset $4\Delta f$. Through adjusting the energy corresponding to the partial peak frequency $f_{SEL}$ to the sum of the plurality of energy increments $P_{ADD}$ and the partial energy peak $P_{SEL}$ by the spectrum adjusting circuit 25, in the adjusted spectrum $C(f)$, the energy corresponding to the partial peak frequency $f_{SEL}$ becomes higher than the energies corresponding to other frequencies. Thus, even in a situation where the energies corresponding to the other frequencies in the original spectrum $Z(f)$ are caused to be higher than the energy corresponding to the partial peak frequency $f_{SEL}$ due to the effects of echo signals (e.g., the energy $P_{+1}$ in FIG. 4(A) is higher than the energy $P_0$), the peak frequency determining circuit 23 is still capable of identifying the peak frequency $\Omega$ corresponding to the actual four-fold carrier frequency offset $4\Delta f$ according to the adjusted spectrum $C(f)$, such that the frequency offset determining circuit 24 may calculate the estimated CFO result $\Delta f_E$.

FIG. 5 shows the spectrum adjusting circuit 25 according to another embodiment. In this embodiment, the spectrum adjusting circuit 25 includes a search circuit 25D, an addition circuit 25E and an adjusting circuit 25F. Similar to the search circuit 25A, the search circuit 25D identifies the partial energy peak value $P_{SEL}$ from the spectrum $Z(f)$, and identifies the partial peak frequency $f_{SEL}$ according to the partial energy peak value $P_{SEL}$. Different from the search circuit 25A, the search circuit 25D does not need to identify the energies corresponding to the frequencies spaced by integral multiples of $1/T$ from the partial peak frequency $f_{SEL}$. The addition circuit 25E adds a predetermined energy increment $P_{DFT}$ and the partial peak frequency $f_{SEL}$ identified by the search circuit 25D to generate an adjusted energy $P_{SUM}$. In practice, the predetermined energy increment $P_{DFT}$ may be designed according to actual communication environments in a way that the adjusted energy $P_{SUM}$ is usually higher than other energies in the spectrum $Z(f)$.

Similar to the adjusting circuit 25C, the adjusting circuit 25F adjusts the spectrum $Z(f)$ according to the partial peak frequency $f_{SEL}$ and the adjusted energy $P_{SUM}$ to generate an adjusted spectrum $C(f)$. In the adjusted spectrum $C(f)$, the energy corresponding to the partial peak frequency $f_{SEL}$ is equal to the adjusted energy $P_{SUM}$.

It should be noted that, in other embodiments of the present invention, the $4^{th}$-power circuit 21 may be replaced by an $M^{th}$-power circuit, where M is an integer greater than 1. In one embodiment, the integer M may be associated with the modulation scheme of the input signal $y(t)$. For example, when the modulation scheme that the transmitter performs on the input signal $y(t)$ is QPSK, the integer M may be designed to equal to 4 or an integral multiple of 4. Similarly, when the modulation scheme that the transmitter performs on the input signal $y(t)$ is 8 phase shift keying (8PSK), the integer M may be designed to equal to 8 or an integral multiple of 8. However, for the $M^{th}$-power circuit, in an ideal situation, the peak frequency $\Omega$ the peak frequency determining circuit 23 identifies corresponds to an M multiple of the carrier frequency offset $\Delta f$. Thus, the frequency offset determining circuit 24 may generate the estimated CFO result $\Delta f_E$ according to the peak frequency $\Omega$ and the value M.

In practice, the peak frequency determining circuit 23, the frequency offset determining circuit 24 and the spectrum adjusting circuit 25 may be realized by various types of control and processing platforms, including fixed and programmable logic circuits, e.g., programmable logic gate arrays, application-specific integrated circuits (ASIC), microcontrollers, microprocessors and digital signal processors (DSP). Further, the peak frequency determining circuit 23, the frequency offset determining circuit 24 and the spectrum adjusting circuit 25 may be designed to complete multiple tasks through executing commands stored in a memory (not shown) by one or more processors. One person skilled in the art can understand that, there are many circuit configurations and elements capable of realizing the concept of the present invention without departing from the spirit of the present invention.

Figure 6:
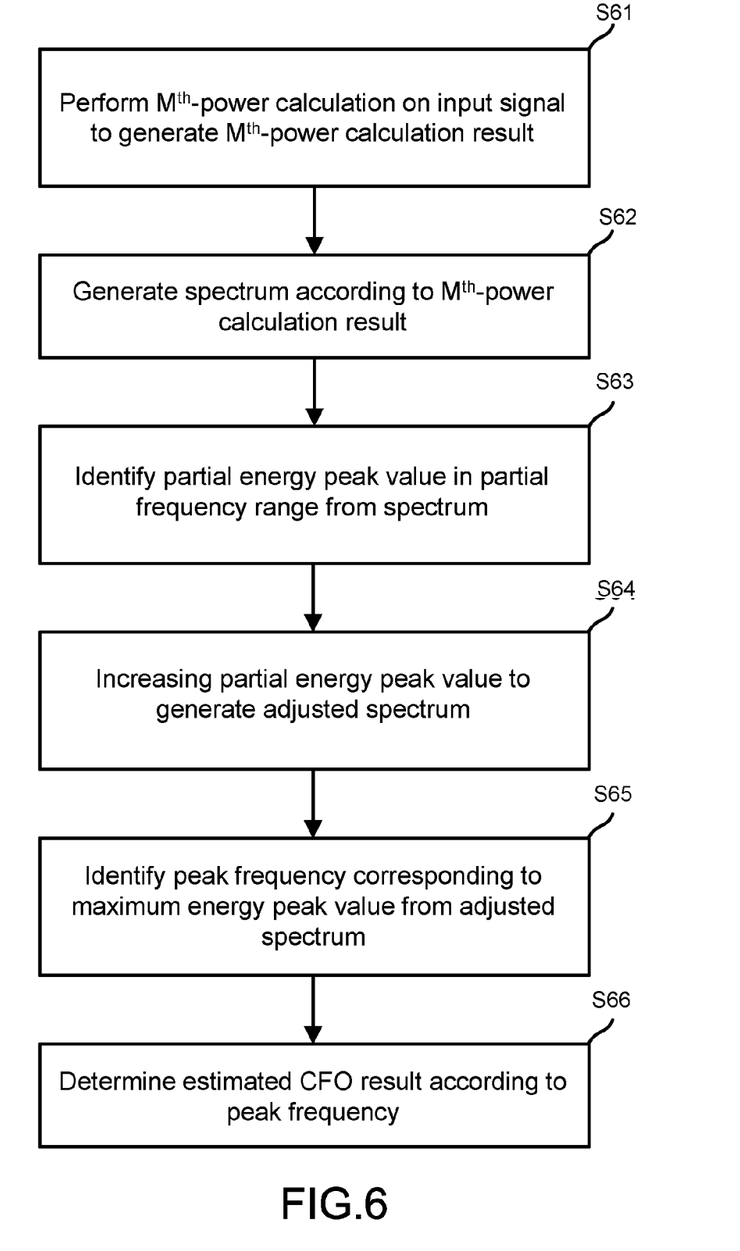
FIG. 6 is a flowchart of a method for estimating carrier frequency offset according to an embodiment of the present invention.

A carrier frequency offset (CFO) estimating method is provided according to another embodiment of the present invention. FIG. 6 shows a flowchart of the method, which includes following steps. In step S61, an $M^{th}$-power calculation is performed on an input signal to generate an $M^{th}$- power calculation result, where M is an integer greater than 1 and is associated with a modulation scheme of the input signal. In step S62, a spectrum is generated according to the $M^{th}$-power calculation result. In step S63, a partial energy peak value in a partial frequency range is identified from the spectrum, wherein the partial frequency range is approximately $-\frac{1}{2}T$ to $\frac{1}{2}T$ and T represents a symbol duration of the input signal. In step S64, the partial energy peak value is increased to be higher than any other energy in the spectrum to accordingly generate an adjusted spectrum. In step S65, a peak frequency corresponding to a maximum energy peak value is identified from the adjusted spectrum. In step S66, an estimated CFO result is determined according to the peak frequency.

One person skilled in the art can understand that, operation variations (e.g., means for adjusting the partial energy peak value) in the description associated with the CFO estimating apparatus 200 are applicable to the CFO estimating method in FIG. 6, and are thus omitted herein.

While the invention has been described by way of example and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for estimating carrier frequency offset (CFO), comprising:
    an $M^{th}$-power calculation circuit for performing an $M^{th}$-power calculation on an input signal to generate an $M^{th}$-power calculation result, where M is an integer greater than 1 and is associated with a modulation scheme of the input signal;
    a spectrum generating circuit for generating a spectrum according to the $M^{th}$-power calculation result;
    a spectrum adjusting circuit for increasing a partial energy peak value in a partial frequency range in the spectrum to generate an adjusted spectrum, wherein the partial frequency range is $-\frac{1}{2}T$ to $\frac{1}{2}T$ and T represents a symbol duration of the input signal;
    a peak frequency determining circuit for identifying a peak frequency from the adjusted spectrum, wherein the peak frequency has a maximum peak energy in the adjusted spectrum; and
    a frequency offset determining circuit for generating an estimated CFO result.

2. The apparatus according to claim 1, wherein the spectrum adjusting circuit comprises:
    a search circuit for identifying the partial energy peak value in the partial frequency range from the spectrum, identifying a corresponding partial peak frequency according to the partial energy peak value, and identifying energies corresponding to a plurality of frequencies that are spaced by integral multiples of 1/T from the partial peak frequency as a plurality of energy increments;
    an addition circuit for adding the energy increments and the partial energy peak value to generate an adjusted energy; and
    an adjusting circuit, adjusting the spectrum according to the partial peak frequency and the adjusted energy to generate the adjusted spectrum, wherein the partial peak frequency corresponds to the adjusted energy in the adjusted spectrum.

3. The apparatus according to claim 1, wherein the spectrum adjusting circuit comprises:
    a search circuit for identifying the partial energy peak value in the partial frequency range from the spectrum, and identifying a corresponding partial peak frequency according to the partial energy peak value;
    an addition circuit for adding a predetermined energy increment and the partial energy peak value to generate an adjusted energy; and
    an adjusting circuit for adjusting the spectrum according to the partial peak frequency and the adjusted energy to generate the adjusted spectrum, wherein the partial peak frequency corresponds to the adjusted energy in the adjusted spectrum.

4. A method for estimating carrier frequency offset (CFO), comprising:
    performing an $M^{th}$-power calculation on an input signal to generate an $M^{th}$-power calculation result, where M is an integer greater than 1 and is associated with a modulation scheme of the input signal;
    generating a spectrum according to the $M^{th}$-power calculation result;
    identifying a partial energy peak value in a partial frequency range from the spectrum, wherein the partial frequency range is $-\frac{1}{2}T$ to $\frac{1}{2}T$ and T represents a symbol duration of the input signal;
    increasing the partial energy peak value to generate an adjusted spectrum;
    identifying a peak frequency from the adjusted spectrum, wherein the peak frequency has a maximum energy peak value in the adjusted spectrum; and
    determining an estimated CFO result according to the peak frequency.

5. The method according to claim 4, wherein the step of increasing the partial energy peak value to generate the adjusted spectrum comprises:
    identifying a corresponding partial peak frequency according to the partial energy peak value;
    identifying energies corresponding to a plurality of frequencies that are spaced by integral multiples of 1/T from the partial peak frequency as a plurality of energy increments;
    adding the energy increments and the partial energy peak value to generate an adjusted energy; and
    adjusting the spectrum according to the partial peak frequency and the adjusted energy to generate the adjusted spectrum, wherein the partial peak frequency corresponds to the adjusted energy in the adjusted spectrum.

6. The method according to claim 4, wherein the step of adjusting the partial energy peak value to generate the adjusted spectrum comprises:
    identifying a corresponding partial peak frequency according to the partial energy peak value;
    adding a predetermined energy increment and the partial energy peak value to generate an adjusted energy; and
    adjusting the spectrum according to the partial peak frequency and the adjusted energy to generate the adjusted spectrum, wherein the partial peak frequency corresponds to the adjusted energy in the adjusted spectrum.

* * * * *